Jan. 16, 1968     J. LOVE     3,363,322

WHEEL ALIGNMENT TESTING DEVICES

Filed June 28, 1965

INVENTOR.

John Love

United States Patent Office 3,363,322
Patented Jan. 16, 1968

3,363,322
WHEEL ALIGNMENT TESTING DEVICES
John Love, 37 Boehm Ave., Mount Tabor, N.J.
Filed June 28, 1965, Ser. No. 467,298
2 Claims. (Cl. 33—203.14)

This invention relates, generally, to drive over wheel alignment testing devices and is concerned, in particular, with an improved and simplified means for detecting and indicating the misalignment of wheels on a vehicle.

Prior devices for the purpose usually embodied a top member rolling on anti-friction bearings and mounted on a relatively fixed bottom member with some form of indicator actuated by the movement of the said top member relative to the said bottom member.

The general object of this invention is to provide a testing mechanism for indicating the misalignment of a pair of wheels, a device so extremely inexpensive to manufacture that it cannot possibly be duplicated by anything known to the arts heretofore.

Another object is to provide a simple means, that will magnify the alignment indication to any degree desirable, which can be determined by the design.

A further object is to provide a device that is small, extremely light in weight and almost indestructible in its entirety.

Another object of this device is its almost unlimited load carrying capabilities, even if made of thin plastic.

Another very important object of this invention is the possibility of a device that is completely void of all levers, springs, sprockets, connecting links, ratchets, rollers, wheels, pivoted pointers, indicator calibrating means, indicating means that could get out of adjustment and limited load bearing capabilities all so common to systems known to the arts heretofore.

Other objects and various advantages of this invention will appear from the following detailed description in conjunction with the accompanying drawings which form part of this specification.

Figure 1:
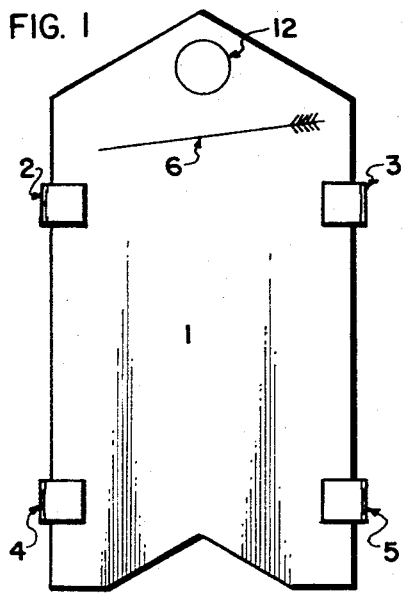

In the said drawings:

FIG. 1 shows the bottom member 1, with four lugs 2, 3, 4 and 5 bent upward and over towards the center, a pointless arrow 6 in an angular position as shown, permanently marked on the said bottom member 1.

Figure 2:
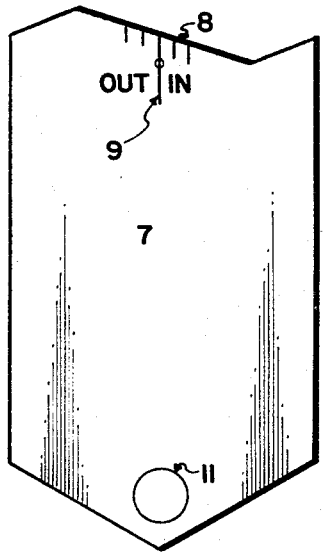

FIG. 2 shows the top member 7 with an edge 8 cut angular as opposed to that of the pointless arrow 6 on the said bottom member 1.

Figure 3:
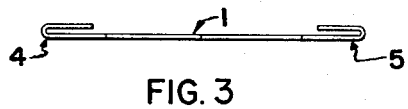

FIG. 3 is an end view of FIG. 1 viewed from the bottom up, showing how the said lugs 2, 3, 4 and 5 are bent around and over to receive and retain the said top member 7.

A zero center indicating line 9, with graduating marks on each side thereof, also the words "In" and "Out," is permanently marked on the said top plate 7 at the edge 8.

Figure 4:
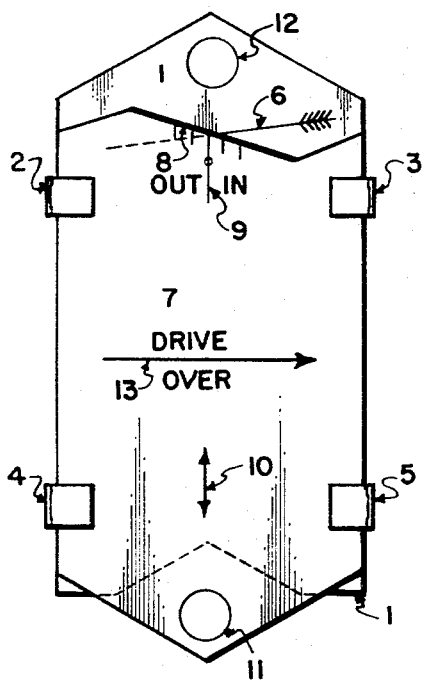

FIG. 4 shows the device assembled, said top member 7 being slidable on the said bottom member 1 in the directions of the double arrow 10, the vehicle between the said top and bottom members being grease, oil, or any slippery substance known to the arts.

The holes 11 and 12 are finger holes for adjusting the device to the zero position preparatory to use.

This invention is based on the fact that a pair of wheels, misaligned relative to each other, will tend to travel in different directions and fight each other, thereby building up tension between them. This said tension will increase until the wheel carrying the lesser load will yield by slipping sideways. It is obvious, therefore, that any one wheel of a pair under the said tension running over a greasy or slippery spot will substantially and momentarily dissipate that said tension by slipping sideways.

The operation of the device is very simple. The device is first manually adjusted so that the said pointless arrow 6 on the bottom member 1 intersects with the zero or center line 9 on the top member 7. The device is then placed about thirty inches ahead of one wheel of a pair and the said wheel run completely over and off it in the direction of the arrow 13. If any tension is built up between the said pair of wheels, it will be dissipated on the device and the amount of the said dissipation will remain registered by the pointless arrow 6 on the graduation marks at the edge 8 on the said top member 7. If the wheels are in true alignment, no movement will take place.

The foregoing disclosure is, of course, to be regarded as descriptive and illustrative only and not as restrictive or limitative of the invention, of which obviously an embodiment may be constructed including many modifications without departing from the general scope herein indicated and denoted in the appending claim. For example, the calibrated edge 8 may be straight across and not angular as shown, without departing from the true intent and purpose of the design and the same may be said of the pointless arrow 6 as only the angular difference between the said two components determines the amplification factor.

In the following claims, the term slippery substance means grease, oil, or any slippery substance known to the arts and the term "indicating end" means the top end as it appears in the drawings.

I claim:

1. In a vehicle wheel testing device comprising a stationary bottom member adapted to be placed in the path of a vehicle wheel and on a plane level with the surface of the wheel support, said bottom member having a plurality of protruding lugs, said lugs being bent snugly upward, over and around the side edges of a top member securing the said top member to the said bottom member but allowing longitudinal movement of the said top member with respect to the said bottom member, said top member having a zero center line with graduation marks and directional information at its indicating edge, said indicating edge angularly intersecting with an arrow mark on the said bottom member, said bottom member and said top member having a slippery substance between them.

2. In combination in a drive over wheel alignment gauge, a top member having a zero center line and directional information and graduation lines indelibly marked on its indicating end, a bottom member having a plurality of protruding lugs, said protruding lugs being bent up and around the edges of the said top member allowing only back and forth movement of the said top member with respect to the said bottom member, said bottom member having an indicating line indelibly marked thereon, said indicating line being angular with respect to the graduation marked edge of the said top member, both said top and bottom members having a slippery substance between them, said combination having indication amplifying ability.

References Cited

UNITED STATES PATENTS

| | | | |
|---|---|---|---|
| 1,231,934 | 7/1917 | Packet | 33—143 |
| 2,033,352 | 3/1936 | Nielsen | 33—203.14 |
| 2,080,909 | 5/1937 | Charlton | 33—203.14 |
| 2,676,415 | 4/1954 | Love | 33—203.14 |

FOREIGN PATENTS

| | | | |
|---|---|---|---|
| 3,958 | 1880 | Great Britain | 33—166 |

WILLIAM D. MARTIN, Jr., *Primary Examiner.*

LEONARD FORMAN, *Examiner.*

UNITED STATES PATENT OFFICE
CERTIFICATE OF CORRECTION

Patent No. 3,363,322                      January 16, 1968

John Love

It is certified that error appears in the above identified patent and that said Letters Patent are hereby corrected as shown below:

In the heading to the printed specification, line 3, "John Love, 37 Boehm Ave., Mount Tabor, N. J." should read -- John Love, Mount Tabor, N. J. (89 Brooklake Rd., Florham Park, N. J. 07932) --.

Signed and sealed this 5th day of August 1969.

(SEAL)
Attest:

Edward M. Fletcher, Jr.                      WILLIAM E. SCHUYLER, JR.
Attesting Officer                              Commissioner of Patents